United States Patent [19]

Bower

[11] 4,367,479

[45] Jan. 4, 1983

[54] METHOD AND APPARATUS FOR PURGING AND/OR PRIMING AN INK JET

[75] Inventor: Kenneth W. Bower, New Milford, Conn.

[73] Assignee: Exxon Research and Engineering Co., Florham Park, N.J.

[21] Appl. No.: 203,582

[22] Filed: Nov. 3, 1980

[51] Int. Cl.[3] .............................................. G01D 15/18

[52] U.S. Cl. .................................... 346/140 R; 346/75

[58] Field of Search ........... 346/75, 1, 140 IJ, 140 PD

[56] References Cited

U.S. PATENT DOCUMENTS

| | | | |
|---|---|---|---|
| 3,111,897 | 11/1963 | Van Buskirk | 101/350 |
| 3,482,258 | 12/1969 | Steen | 346/140 |
| 3,597,124 | 8/1971 | Adams | 417/477 |
| 3,739,717 | 6/1973 | Brown et al. | 101/37 |
| 3,761,953 | 9/1973 | Helgeson et al. | 346/75 |
| 3,787,880 | 1/1974 | Kattner et al. | 346/75 |
| 3,909,831 | 9/1975 | Marchio et cl. | 346/140 |
| 3,936,135 | 2/1976 | Duffield | 346/1 |
| 3,961,337 | 6/1976 | Jung et al. | 346/140 R |
| 3,972,051 | 7/1976 | Lundquist et al. | 346/1 |
| 3,974,508 | 8/1976 | Blumenthal | 346/140 PD |
| 3,990,444 | 11/1976 | Vial | 128/214 F |
| 4,023,182 | 5/1977 | Arway et al. | 346/75 |
| 4,042,937 | 8/1977 | Perry et al. | 346/1 |
| 4,074,284 | 2/1978 | Dexter et al. | 346/140 R |
| 4,080,608 | 3/1978 | Stoneburner et al. | 346/75 |
| 4,122,457 | 10/1978 | Erickson et al. | 346/75 |
| 4,123,761 | 10/1978 | Kimura et al. | 346/140 |
| 4,162,501 | 7/1979 | Mitchell et al. | 346/140 R |
| 4,170,016 | 10/1979 | Geil | 346/75 X |

FOREIGN PATENT DOCUMENTS

| | | |
|---|---|---|
| 578944 | 12/1974 | Switzerland . |
| 581025 | 4/1975 | Switzerland . |

*Primary Examiner*—George H. Miller, Jr.
*Attorney, Agent, or Firm*—Norman L. Norris

[57] ABSTRACT

A catcher is associated with the nozzle of the jet. The catcher includes a chamber around the nozzle with an opening in the chamber for withdrawing ink and an opening for projecting droplets of ink therethrough.

21 Claims, 7 Drawing Figures

METHOD AND APPARATUS FOR PURGING AND/OR PRIMING AN INK JET

BACKGROUND OF THE INVENTION

This invention relates to the catching of ink at an ink jet orifice during the priming and/or purging of an ink prior to ink jet printing.

In ink jet printing applications, it is necessary to prime an ink jet with ink prior to initiating printing so as to assure that ink is available at the orifice of an ink jet when required. Typically, this involves the introduction of a substantial amount of ink into an ink jet which necessarily produces a collection of ink at the ink jet orifice which must be removed prior to initiating printing. If the collection of ink, which may resemble a glob at the orifice of the ink jet, is not removed prior to printing, it is not possible to precisely project droplets of ink with the appropriate resolution and direction for ink jet printing. It will, of course, be appreciated that the evaporation of this collection of ink at the orifice could actually produce a blockage of the ink jet.

A similar requirement for removal of ink which collects at the orifice of an ink jet occurs during the purging of an ink jet. Purging occurs when it is desirable to clean the ink jet and remove all debris including the residue of evaporated ink. During purging, a substantial amount of ink is passed through the ink jet with a resulting collection at the ink jet orifice. This ink must also be removed prior to printing for the reasons discussed above.

Heretofore, various techniques have been utilized to remove the collection of ink which occurs as a result of priming and/or purging. One technique involves the mechanical wiping of the ink jet tip. Other techniques involve the use of a charging ring or rod, positioned near the tip of the jet, which relies upon gravity and the wetting action of the ink or printing fluid to remove the collection of ink at the ink jet orifice which occurs during priming or purging.

U.S. Pat. No. 4,123,761—Kimura et al. discloses the use of a suction tube which is movable into a position adjacent an ink jet orifice for purposes of removing ink emerging from the orifice of the ink jet during purging. The suction tube, which does not form part of a chamber surrounding the orifice, is substantially axially aligned with the ink jet orifice during purging.

U.S. Pat. No. 3,972,051—Lundquist et al. discloses the use of air suction adjacent an ink jet orifice. However, the air suction is not utilized nor is it operable with respect to the ink to remove ink. Rather, the purpose of the air suction is to prevent air build-up at the document interface and to maintain laminarity at the document interface.

U.S. Pat. Nos. 3,936,135—Duffield and 4,023,182—Arway et al. disclose the use of vacuum catchers communicating with the orifice of an ink jet. However, the purpose of these catchers is to collect ink jet droplets which are projected from the orifice as contrasted with the collection of ink at the orifice. For this reason, the ink jet catchers are spaced from and do not form part of a catcher chamber at the ink jet orifice. Swiss Pat. No. 581,025 discloses a similar catcher arrangement for projected droplets of ink.

SUMMARY OF THE INVENTION

It is an overall object of this invention to provide a method and apparatus for effectively removing a collection of ink at an ink jet orifice which may, for example, result from priming or purging.

It is a further object of this invention to provide such a method and apparatus which does not rely upon gravity, and more specifically, which is not dependent upon the particular orientation of the ink jet with respect to the force of gravity.

It is a further object of this invention to provide a method and apparatus for removing a collection of ink in an ink jet orifice which may be automatically accomplished without intervention of an operator.

In accordance with these and other objects, a preferred embodiment of the invention comprises an ink jet apparatus including an ink reservoir, an ink jet orifice, supply means coupling the reservoir to the orifice and means for forcing the ink from the reservoir to the orifice during a priming and/or purging operation. The improvement comprises an ink jet catcher chamber located immediately adjacent and fixedly mounted with respect to the orifice and means for withdrawing ink from the chamber during purging and/or priming.

In the preferred embodiment of the invention, the chamber includes a droplet projection opening substantially aligned with the orifice so as to permit droplets of ink to project therethrough and an ink withdrawal opening substantially nonaligned with the orifice and communicating with the withdrawing means. Preferably, the droplet projection opening is substantially larger than the orifice.

In accordance with one important aspect of the invention, the chamber may include a closure means adapted to open and close the projection opening. The closure means may comprise a sliding member, and the chamber includes a wall having the projection opening therein. The closure is adapted to slidingly cooperate with the wall to open and close the projection opening.

In accordance with another important aspect, the ink jet may include a nozzle having an orifice at one end with the nozzle projecting into the chamber. The nozzle is sealed within the chamber. Tubular means may also extend into the chamber with a withdrawal opening being located at one end of the tubular means. The face of the tubular means at the withdrawal opening may be substantially inclined with respect to the axis of the tubular means. For example, the face may be inclined at an angle of 30° to 60° with respect to the axis of the tubular means with the face directed substantially away from the orifice of the ink jet.

DETAILED DESCRIPTION OF A PREFERRED EMBODIMENT

Figure 1:
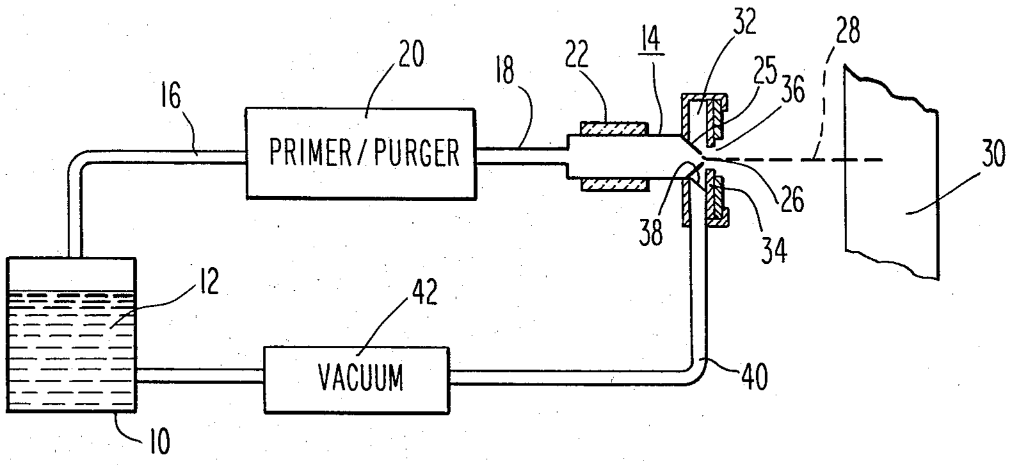
FIG. 1 is a schematic drawing representing a system incorporating a preferred embodiment of the invention.

Referring to FIG. 1, an ink jet system comprises a reservoir 10 containing a writing fluid or ink 12. The reservoir 10 supplies an ink jet 14 with ink through a tube 16 and a tube 18. A primer/purger 20, which comprises a pump located between the tube 16 and the tube 18, supplies ink to the jet 14 during priming and purging.

The ink jet 14 comprises a cylindrical transducer 22, such as a piezoelectric crystal, surrounding a glass tube which is terminated in a nozzle 25 having an orifice 26. As the transducer 22 is energized, droplets 28 of ink are projected toward the document or ink receiving medium 30.

Figure 6:
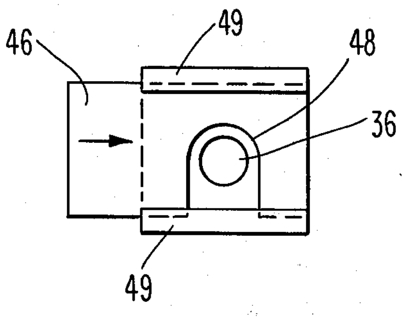
FIG. 6 is an end view taken along line 6—6 of FIG. 3.

In accordance with the invention, an ink catcher chamber 32 surrounds and is fixedly mounted with respect to the nozzle 25 including the orifice 26. The chamber 32 includes a wall 34 having an ink droplet projection opening 36 therein, which is substantially aligned with the orifice 26 so as to permit the droplets of ink 28 to be projected toward the document 30. As best shown in FIG. 6, the droplet projection opening 36 is substantially larger than the orifice 26. The chamber 32 also includes an ink withdrawal opening 38 which permits ink to be withdrawn from the chamber 32 through a tube 40 which is connected to a vacuum source 42 for returning ink to the reservoir 10.

Figure 3:
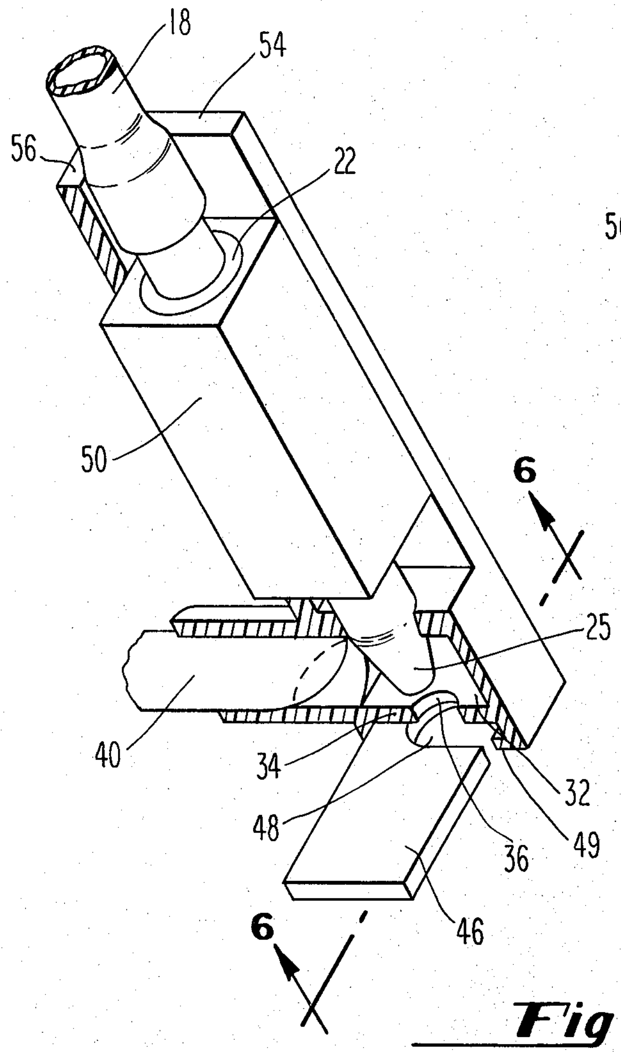
FIG. 3 is a cutaway perspective view similar to FIG. 2 with the ink jet prepared for writing, after purging and/or priming.
Figure 2:
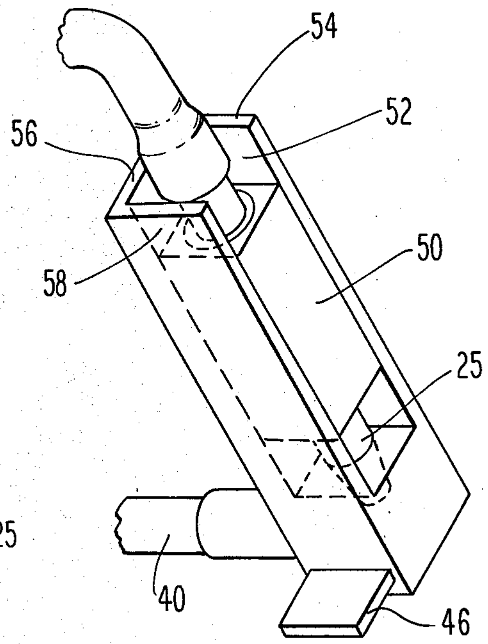
FIG. 2 is a perspective view of the preferred embodiment of the invention.
Figure 4:
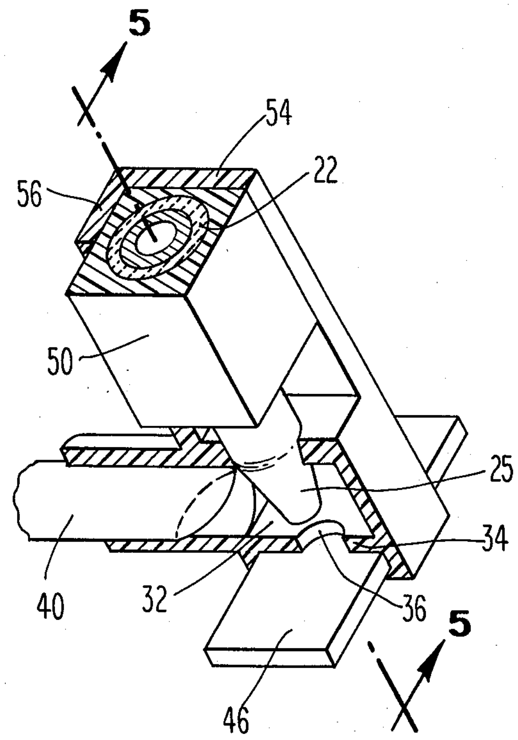
FIG. 4 is a cutaway perspective view similar to FIG. 3, but during purging and/or priming.
Figure 5:
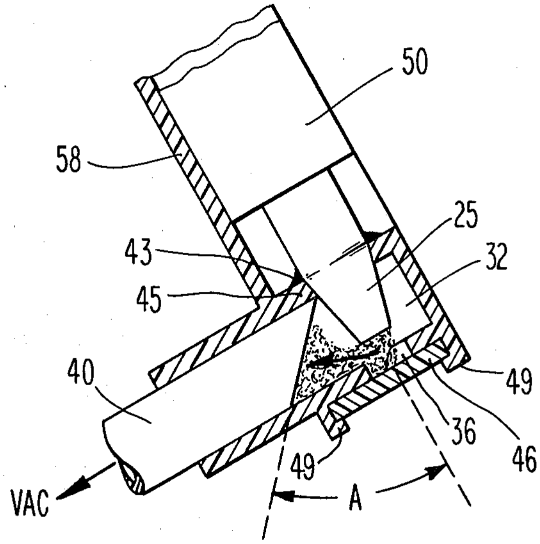
FIG. 5 is a sectional view taken along line 5—5 of FIG. 4.

As shown in FIGS. 3–5, the nozzle 25, as well as the tube 40, extend into the chamber 32. Both the nozzle, including the orifice 24 and the tube 40 are sealed within the chamber 32 so as to assure the effectiveness of the vacuum source 42 in removing ink from the chamber 32. In this regard, a sealant 43 is used between the nozzle 25 and the rear ball 45 of the chamber 32 as shown in FIG. 5.

In accordance with one important aspect of the invention, as shown in FIG. 5, the face of the tube 40 at the withdrawal opening 38 is substantially inclined with respect to the axis of the orifice so as to substantially face away from the orifice 26. More specifically, the face of the tube 38 is inclined at an angle A of approximately 30° to 60° with respect to the axis of the orifice and preferably at an angle of 45°. It is also inclined at a complementary angle of 30° to 60° with respect to the axis of the opening of the tube 40. By utilizing this angle of inclination and allowing the tip of the tube 40 to contact the nozzle as it enters the chamber 32, the collection of ink at the interface of the jet and the chamber may be prevented and the droplets may be guided into the tube 40 for removal by the vacuum source 42.

Figure 7:
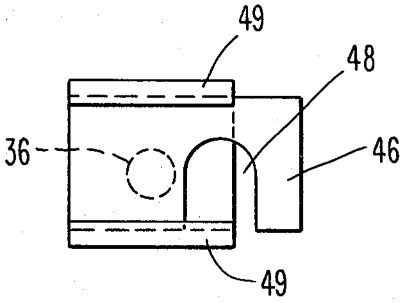
FIG. 7 is an end view taken along line 7—7 of FIG. 4.

In accordance with another important aspect of the invention, as shown in FIGS. 2–7 closure means are provided for the droplet projection opening 36. The closure means comprise a slidable cover 46 adapted to slidingly engage and cooperate with the wall 34 of the chamber 32. The cover 46 may be held in place by small projections 49 on the front of the wall 34 which form a track. The cover 46 may be moved such that a hole 48 in the cover 46 is aligned with the droplet projection opening 36 as shown in FIGS. 3 and 6 so as to permit the droplets 28 to be projected toward the document 30. The track also permits movement of the cover 46 such that a solid portion of the cover 46 is aligned with the droplet projection opening 36 as shown in FIGS. 4, 5 and 7. When the cover 46 is in the closed position as shown in FIGS. 4, 5 and 7, priming and/or purging may occur. The cover 46 may also be placed in the closed position as shown in FIGS. 4, 5 and 7 when the ink jet is not in use so as to prevent the evaporation of ink and the accumulation of dust and dirt at the orifice 26.

It should be understood that during priming and purging it may be desirable to permit a substantial collection of ink within the chamber 32 prior to activating the vacuum source 42 as shown in FIG. 5. In other words, the primer/purger 20 is activated first so as to permit the collection of ink within the chamber 32 prior to activating the vacuum source 42. This assures that any debris within the chamber becomes emersed in the collecting ink and may, therefore, be readily removed by the vacuum source 42 for return to the reservoir 10. In addition, it is in some instances desirable to move the cover 46 to the open position with the hole 48 aligned with the withdrawal opening 38, while the vacuum source 42 is energized so as to allow air to rush into the chamber 32 and sweep past the orifice 26 so as to remove debris and even the smallest droplets from the orifice 26.

It will, therefore, be appreciated that it is desirable to operate the system shown in FIGS. 1–7 in the following manner: Close the cover 46; activate the primer/purger 20 so as to flood the chamber 32 with ink; activate the vacuum source 42, so as to withdraw the ink from the flooded chamber; open the cover 46; and deactivate the vacuum source 42.

As also shown in FIGS. 2–5, the transducer 22 is potted in a suitable material 50 such as RTV silicone rubber. The potted material may then be held in place within a receptacle 52 including walls 54, 56 and 58.

As shown in FIGS. 1–5, the ink jet 14 is of the impulse or demand type. It will, however, be appreciated that other types of ink jet, such as for example, a continuous type, may then be employed while utilizing the principles of this invention. It will also be appreciated that various apparatus may be utilized in the primer/-purger 20, including that disclosed in copending application Ser. No. 78,131 filed Sept. 24, 1979. Moreover, it may be desirable to utilize a sensor apparatus in the chamber 32 such as that disclosed in the aforesaid copending application Ser. No. 78,131 filed Sept. 24, 1979 for determining when the chamber 32 is full.

The invention may have a variety of applications, but it is believed to be particularly applicable to systems wherein it is desirable to minimize the maintenance performed by operators of ink jet printing equipment. For example, the invention may be incorporated in a disposable ink jet printing apparatus such as that disclosed in copending application Ser. Nos. 203,583; 203,584 and 203,589.

Although the dimensions of the chamber 32 may vary, it is preferred that the overall volume of the chamber 32 be 0.176 to 0.245 cc and preferably 0.180–0.200 cc. It is also preferred that the maximum cross-sectional area of the droplet projection opening 36 be in the range of 0.9 to 1.1 mm as compared with the cross-sectional diameter of the orifice 26, which should be in the range of 0.075 to 0.10 mm.

Although a particular embodiment of the invention has been shown and described various modifications suggested, other embodiments and modifications will occur to those of ordinary skill in the art which fall within the true spirit and scope of the invention as set forth in the appended claims.

What is claimed is:

1. Ink jet apparatus comprising an ink reservoir, an ink jet nozzle terminating in an orifice, supply means coupling said reservoir to said orifice, and means for forcing the ink from said reservoir to said orifice during priming and/or purging, the improvement comprising an ink catcher chamber located immediately adjacent and fixedly mounted with respect to said nozzle and means for withdrawing ink from said chamber during priming and/or purging, said nozzle extending into said chamber.

2. The ink jet apparatus of claim 1 wherein said nozzle is sealed in said chamber.

3. The ink jet apparatus of claim 1 wherein said chamber includes a droplet projection opening substantially aligned with said orifice so as to permit droplets of ink to project therethrough and an ink withdrawal opening substantially nonaligned with said orifice in communication with said withdrawing means.

4. The ink jet apparatus of claim 3 wherein said droplet projection opening is substantially larger than said orifice.

5. The ink jet apparatus of claim 1 or 3 wherein said chamber is sealed to and around said orifice.

6. The ink jet apparatus of claim 1 or 3 further comprising tubular means extending into said chamber and having said withdrawal opening located at one end thereof.

7. The ink jet apparatus of claim 3 wherein said chamber includes closure means adapted to open and close said projection opening.

8. The ink jet apparatus of claim 7 wherein said closure means comprises a sliding member and said chamber includes a wall having said projection opening therein, said closure means adapted to slidingly cooperate with said wall to open and close said projection opening.

9. The ink jet apparatus of claim 3 further comprising tubular means extending into said chamber and having said withdrawal opening located at one end thereof, said tubular means having a face at said opening substantially inclined with respect to the axis of said orifice.

10. The ink jet apparatus of claim 9 further comprising tubular means extending into said chamber and having said withdrawal opening located at one end thereof, said tubular means having a face at said opening substantially inclined with respect to the axis of said orifice.

11. The ink jet apparatus of claim 9 wherein said face is inclined at an angle of 30°–60° with respect to said axis such that said face generally points away from said orifice.

12. The ink jet apparatus of claim 9 wherein said face is inclined at an angle of 30°–60° with respect to said axis such that said face generally points away from said orifice.

13. The ink jet apparatus of claim 12 wherein said face is also inclined at an angle of 30°–60° with respect to the axis of said withdrawal opening.

14. Ink jet apparatus comprising an ink reservoir, an ink jet orifice, supply means coupling said reservoir to said orifice, and means for projecting droplets of ink from said orifice, the improvement comprising a chamber having a droplet projection opening juxtaposed to and located externally of said orifice, said chamber including movable closure means for opening and closing said opening.

15. The ink jet apparatus of claim 14 wherein said closure means comprises a sliding member and said chamber includes a wall having said projection opening therein, said closure adapted to slidingly cooperate with said wall to open and close said projection opening.

16. The ink jet apparatus of claim 14 further comprising means coupled to and permitting said closure means to slide juxtaposed outwardly of said orifice.

17. The ink jet apparatus of claim 14 wherein said orifice is sealed off by said closure means.

18. A method of operating an ink jet apparatus comprising an ink jet orifice, a chamber surrounding said orifice outwardly thereof and a droplet projection opening justaposed to said orifice, the method comprising the following steps:

flooding said chamber with ink through said orifice;
withdrawing the ink from said flooded chamber; and
projecting droplets of ink from said chamber.

19. The method of claim 18 wherein said apparatus further comprises movable closure means for opening and closing said droplet projection opening, said method comprising the following additional steps:

closing said opening before flooding; and
opening said opening after withdrawing.

20. The method of claim 19 including the following additional step:

continuing withdrawing after opening said opening.

21. The method of claim 18, 19 or 20 wherein said step of withdrawing comprises the application of a substantial vacuum to said chamber.

* * * * *